(12) United States Patent
Constantin et al.

(10) Patent No.: US 11,360,649 B2
(45) Date of Patent: Jun. 14, 2022

(54) CUSTOM PREVIEW INTERFACE FOR SEARCH RESULTS

(71) Applicant: salesforce.com, inc., San Francisco, CA (US)

(72) Inventors: Eric Constantin, San Francisco, CA (US); Alexander Lovell, San Francisco, CA (US); Glenn Sorrentino, San Francisco, CA (US); Oleg Yanchinskiy, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/776,394

(22) Filed: Jan. 29, 2020

(65) Prior Publication Data

US 2021/0081086 A1    Mar. 18, 2021

Related U.S. Application Data

(60) Provisional application No. 62/902,079, filed on Sep. 18, 2019.

(51) Int. Cl.
*G06F 3/0484* (2022.01)
*G06F 3/0482* (2013.01)
*G06F 16/248* (2019.01)
*G06F 16/25* (2019.01)
*G06F 16/9535* (2019.01)

(52) U.S. Cl.
CPC .......... *G06F 3/0484* (2013.01); *G06F 3/0482* (2013.01); *G06F 16/248* (2019.01); *G06F 16/252* (2019.01); *G06F 16/9535* (2019.01)

(58) Field of Classification Search
None
See application file for complete search history.

(56) References Cited

U.S. PATENT DOCUMENTS

| 7,328,407 B2 * | 2/2008 | MacLaurin | ............. G06F 9/451 |
| | | | 715/744 |
| 7,519,595 B2 * | 4/2009 | Solaro | ................... G06F 16/338 |

(Continued)

OTHER PUBLICATIONS

How to search on Google; https://support.google.com/websearch/answer/134479?hl=en; 2 pages. [Retrieved Sep. 17, 2019].

*Primary Examiner* — Christopher J Fibbi
(74) *Attorney, Agent, or Firm* — Kowert, Hood, Munyon, Rankin & Goetzel, P.C.

(57) ABSTRACT

Techniques are disclosed relating to generating custom previews for search results provided by a search service. For example, in various embodiments, a server system that provides a search service may receive a custom preview definition from a user associated with a first group of users. The custom preview definition may specify code that is usable to generate a custom preview interface for search results of a particular record type. The server system may use the custom preview definition to generate a custom preview interface for search results provided to users of the first group. For example, the server system may receive user input identifying a first search result provided by the search service. The server system may then determine that the record type of the first search result matches the particular record type and retrieve the specified code to facilitate display of the custom preview interface at the client device.

19 Claims, 9 Drawing Sheets

(56) References Cited

U.S. PATENT DOCUMENTS

| | | | | |
|---|---|---|---|---|
| 7,797,635 | B1* | 9/2010 | Denise | G06F 16/9038 |
| | | | | 715/738 |
| 8,650,260 | B2* | 2/2014 | Pohlmann | H04L 67/1097 |
| | | | | 709/215 |
| 8,966,440 | B2* | 2/2015 | No | G06F 9/44 |
| | | | | 717/113 |
| 10,127,285 | B2* | 11/2018 | Vuppala | G06F 16/24578 |
| 2008/0235608 | A1* | 9/2008 | Prabhu | G06F 16/9535 |
| | | | | 715/765 |
| 2010/0131491 | A1* | 5/2010 | Lemaire | G06F 16/9038 |
| | | | | 707/722 |
| 2012/0226995 | A1* | 9/2012 | Kimchi | G06F 21/6263 |
| | | | | 715/747 |
| 2013/0198174 | A1* | 8/2013 | Poznanski | G06F 16/9535 |
| | | | | 707/723 |
| 2015/0160806 | A1* | 6/2015 | Fey | G06F 16/9535 |
| | | | | 715/748 |
| 2017/0004473 | A1* | 1/2017 | Wallace | G06Q 20/204 |

* cited by examiner

500

```
┌─────────────────────────────────────────────────────────────────────────────┐
│ Receive, at a computer system of a search service, a custom preview         │
│ definition that specifies code usable to generate a custom preview          │
│ interface for search results of a particular record type, where the         │
│ custom preview definition is received from a user of the search service    │
│                                    502                                      │
└─────────────────────────────────────────────────────────────────────────────┘
                                      │
                                      ▼
┌─────────────────────────────────────────────────────────────────────────────┐
│ Receive, from a client device, a search query from a particular user of     │
│ the search service                                                          │
│                                    504                                      │
└─────────────────────────────────────────────────────────────────────────────┘
                                      │
                                      ▼
┌─────────────────────────────────────────────────────────────────────────────┐
│ Based on the search query, provide one or more search results to the        │
│ client device, where each of the one or more search results is associated   │
│ with corresponding metadata                                                 │
│                                    506                                      │
└─────────────────────────────────────────────────────────────────────────────┘
                                      │
                                      ▼
┌─────────────────────────────────────────────────────────────────────────────┐
│ Receive, from the client device, user input identifying a first search      │
│ result of the one or more search results                                    │
│                                    508                                      │
└─────────────────────────────────────────────────────────────────────────────┘
                                      │
                                      ▼
┌─────────────────────────────────────────────────────────────────────────────┐
│ Determine, based on the corresponding metadata associated with the first    │
│ search result, that a record type of a first search result matches the      │
│ particular record type                                                      │
│                                    510                                      │
└─────────────────────────────────────────────────────────────────────────────┘
                                      │
                                      ▼
┌─────────────────────────────────────────────────────────────────────────────┐
│ Retrieve the specified code to facilitate display of the custom preview     │
│ interface for the first search result at the client device                  │
│                                    512                                      │
└─────────────────────────────────────────────────────────────────────────────┘
```

FIG. 5

CUSTOM PREVIEW INTERFACE FOR SEARCH RESULTS

This application claims the benefit of U.S. Provisional Application No. 62/902,079, filed on Sep. 18, 2019, which is hereby incorporated by reference as if entirely set forth herein.

BACKGROUND

Technical Field

This disclosure relates generally to search services, and more particularly to providing custom preview interfaces for search results provided by a search service.

Description of the Related Art

Server systems, which may include application servers, search servers, data storage systems, etc., may provide various services to users. For example, a server system may provide a search service either alone or attendant to other services. Such search services will commonly retrieve search results based on a search query provided by a user. These search results may then be provided to the user, for example, in a list sorted by relevance. In some instances, however, providing search results in such a manner may present various shortcomings. For example, for search results with similar attributes, it may be difficult for the user to discern which of the search results provided by the search service is the search result of interest, requiring the user to manually inspect multiple returned search results. Thus, in various instances, it may be desirable to implement a search service that allows a user to identify the desired search results in a more efficient manner.

BRIEF DESCRIPTION OF THE DRAWINGS

FIG. 5 is a flow diagram illustrating an example method for providing a custom preview interface for a selected search result, according to some embodiments.

DETAILED DESCRIPTION

Figure 1:
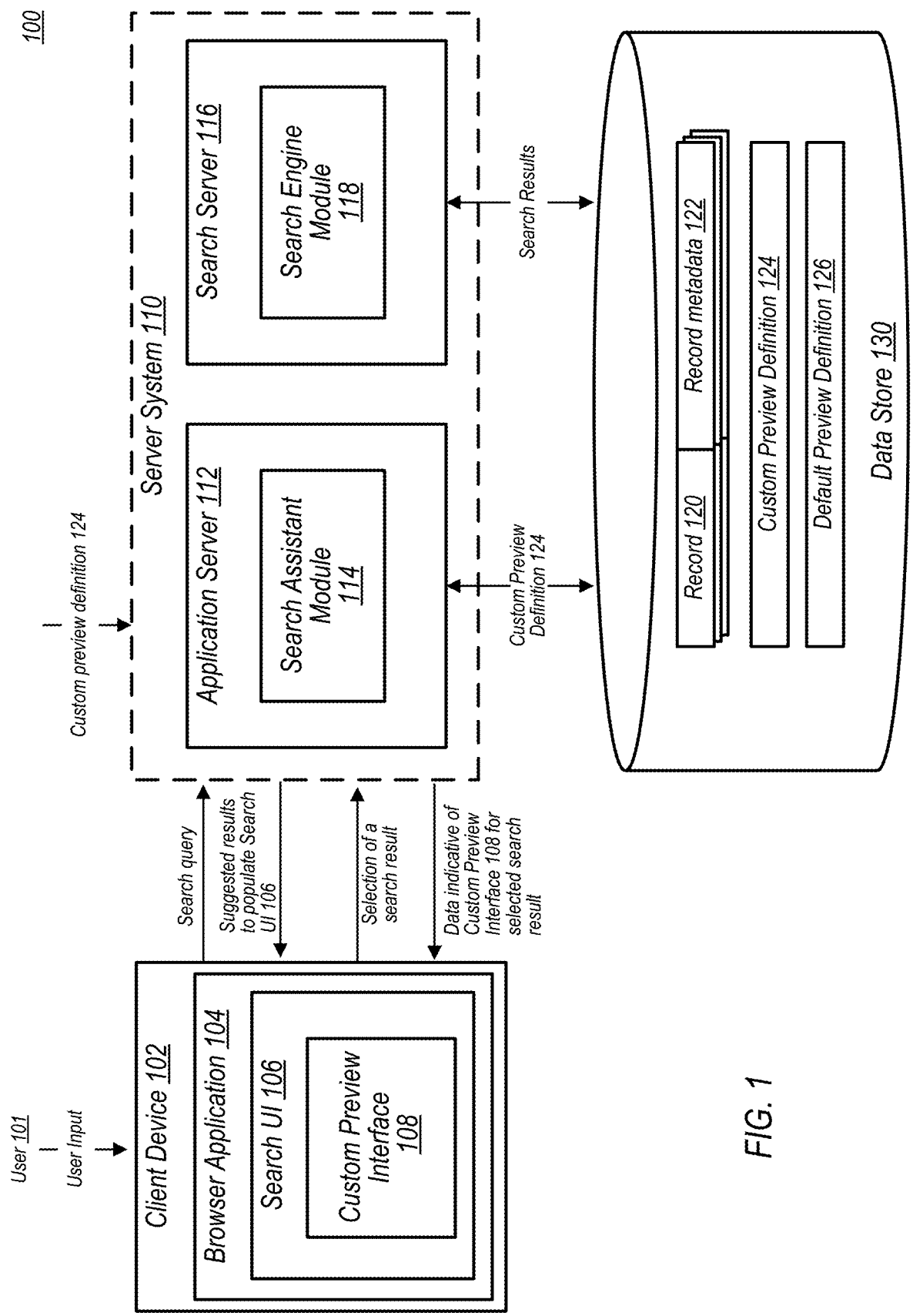
FIG. 1 is a block diagram illustrating a system in which custom preview interfaces for search results may be provided to users of a search service, according to some embodiments.

Referring now to FIG. 1, a block diagram depicts an example system 100 in which custom preview interfaces for search results may be provided to a user of a search service, according to some embodiments. In the embodiment of FIG. 1, system 100 includes client device 102, server system 110, and data store 130. In various embodiments, server system 110 provides a search service to various remote users via one or more communication networks (not shown, for clarity). This search service may be provided by server system 110 either in isolation or in addition to other web services (e.g., customer relationship management ("CRM") services, messaging services, data storage services, etc.) provided by the server system 110.

In FIG. 1, server system 110 includes application server 112 and search server 116. In various embodiments, server system 110 is operable to receive search requests from client devices, retrieve appropriate search results from data store 130, and provide one more search results to the requesting client devices. In FIG. 1, client device 102 is shown executing a browser application 104, which user 101 may use to access one or more web services, such as the search service, provided by server system 110. Client device 102 may be any of various types of computing devices, such as a desktop computer, laptop computer, tablet computer, smartphone, etc. Browser application 104 may be any of various suitable web browsing application (including mobile web browsing applications), such as Mozilla™ Firefox, Google™ Chrome, etc. In the depicted embodiment, user 101 uses browser application 104 to navigate to a web page provided by the server system 110 and submits a search query via a search user interface ("UI") 106 provided on that web page. For example, the user 101 may input a search string to be used by the server system 110 to retrieve appropriate search results. (Note that, in various embodiments, user 101 may access one or more web services provided by server system 110 using software applications executing on the client device 102 other than (or in addition to) the browser application 104.)

In various embodiments, server system 110 is operable to provide suggested search results that may be used to populate a search UI 106. For example, as server system 110 receives the search query from the client device 102, search server 116 may use the search engine module 118 to proactively retrieve suggested search results from data store 130 as the user enters the search query into the search UI 106. In various embodiments, search server 116 may be implemented as an Apache™ Solr server and the search engine module 118 may be implemented using the Apache™ Lucene search engine library. Note, however, that these embodiments are provided merely as examples and are not intended to limit the scope of the present disclosure. In other embodiments, various other suitable search engine technologies may be used, such as Elasticsearch™, Sphinx™, etc. Once retrieved from the data store 130, these suggested search results may be sent to the client device 102 to be presented to the user 101 via the search UI 106, as described in more detail below with reference to FIGS. 2A-2B.

As shown in FIG. 1, application server 112 includes search assistant module 114. In various embodiments, search assistant module 114 is operable to provide various services to improve the functioning and usability of the search service provided by the server system 110. In the context of the present disclosure, search assistant module 114 is operable to provide a custom preview interface 108 that allows user 101 to inspect or interact with a given search result, of the various search results provided in response to the search query, within the search UI 106. This custom preview interface 108 may provide various improvements to the functioning of the search service hosted by the server system 110. For example, as noted above, prior search services may provide search results in a manner that does not allow the user to meaningfully preview or interact with a given search result without first opening the search result for manual inspection. For example, in such a prior system, the user may submit a search query to find a specific file. In response, such a search service may simply return a list of relevant search results with little or no additional information about the content or attributes of the results. In such prior systems, the user would be required to manually inspect one or more of the search results in a "guess-and-check" manner until he or she found the desired file. This technical shortcoming of such prior systems presents various practical problems for the user. For example, in instances in which there are a number of search results with similar names, it may be burdensome for the user to find the desired search result, resulting in significant waste in time and productivity.

Further, although some prior search services may provide search results with a limited, system-provided preview for some select types of search results, these systems similarly present various technical shortcomings. For example, consider an Internet search engine that, whenever a location is entered as a search query, the search engine provides a limited, system-provided preview in its search interface that displays the current weather conditions in that location. If a user were to enter the search query "San Francisco" into such a search service, for example, the search service may populate its search interface with a suggested search results specifying the current weather conditions in San Francisco. Such system-provided previews still present various problems for the user, however. For example, since such system-provided previews are specified by the search service itself (e.g., Google™, Bing™, etc.), the preview presented to the user is necessarily not tailored for that user. Instead, all users of such a search service may be presented with a similar preview when they enter a similar search query.

In many instances, it may be desirable to provide, for the search results, previews that are specific to the requesting user or a group with which the user is associated. For example, in some embodiments, server system 110 may provide computing resources, such as maintaining data and hosting web services, for groups of users that belong to a common organization. For example, data store 130 may store various data records 120 associated with different organizations and users of the server system 110. Each data record 120 stored by the data store 130 may be associated with corresponding record metadata 122, according to some embodiments. As a non-limiting example, in some embodiments, record metadata 122 for a given data record 120 may include one or more of the following data fields: a record identifier field, a record type field, a record name field, an organization identifier field, one or more custom fields, etc. Note, however, that these fields are listed merely as examples and are not intended to limit the scope of the present disclosure. In other embodiments, record metadata 122 may include any other suitable combination of data fields. Further, note that, in some embodiments, server system 110 is a multi-tenant computer system that provides computing resources for a plurality of tenants. As used herein, the term "multi-tenant computer system" refers to a system in which various elements of hardware and software are shared by one or more tenants, each of which may include any suitable number of users. In various embodiments, data for different tenants may be securely stored such that other tenants cannot access the data, absent permission. For example, in some such embodiments, data store 130 is a multi-tenant database that securely stores data for various tenants of the multi-tenant server system 110. (Note that, although shown separately in FIG. 1, data store 130 may be considered part of the server system 110 in some embodiments.)

In various embodiments, a given organization (e.g., a tenant) may specify one or more custom preview interfaces 108 to be used when the search service provides search results to a requesting user that belongs to that organization. As one non-limiting example, a first organization may maintain data corresponding to products or services provided by that organization. In this example, the first organization may wish to provide its users with a customized preview of data records for these products or services when they are returned as search results by the search service. In the prior search services described above in which only limited, system-level previews are presented to the user, there is no way for the first organization to achieve this goal, resulting in wasted time and effort on the part of the user as he or she attempts to identify the desired search result.

Various embodiments of the present disclosure, however, provide a technical solution to the technical shortcomings of prior systems by allowing an organization to tailor the way in which previews for selected search results are presented for its users. For example, various disclosed embodiments allow for organizations (e.g., tenants) that use the server system 110 to specify custom preview definitions 124 that may be used to generate custom, organization-specific preview interfaces 108 for search results as they are presented to users associated with that organization. For instance, an organization may specify a custom preview interface 108 that includes custom quick-links, displayed lists, or action items that the organization deems useful for a particular record or a particular record type. As described in more detail below, these custom preview interfaces 108 may include a much richer set of information about the selected search result (relative to no preview or a default preview of the search result) that allows the requesting user to quickly identify and interact with a given search result presented via the custom preview interface 108. This, in turn, may improve the speed and effectiveness with which a user uses the search service, thereby improving the user experience and the search service as a whole.

In various embodiments, an organization is able to replace a predefined, default preview definition 126 for a particular record type with a custom preview definition 124 specified by the organization. For example, as shown in FIG. 1, a user may provide a custom preview definition 124 that may be used to generate a custom preview interface 108 for search results of a particular record type. In various embodiments, data store 130 may be used to maintain custom preview definition 124 from some or all of the groups that use server system 110. Further, in various embodiments, each of these groups may provide custom preview definition 124 for one or more record types, as desired. For instance, continuing with the example above, a user (e.g., an administrator) associated with a first organization may provide a custom preview definition 124 that includes code usable to generate a custom preview interface 108 when search results of a specific record type are returned to a user that belongs to the first organization. In various embodiments, this code may be provided in any of various suitable programming, scripting, or markup languages, such as Java, Apex, C++, JavaScript, Python, HTML, CSS, etc., or any suitable format, including a data-interchange format such as JSON. Further note that, in various embodiments, search assistant module 114 may assist an organization in specifying a custom preview definition 124 using an interface (e.g., a software assistant) in which the organization may add components (e.g., task lists, charts, calendars, etc.) to a custom preview interface 108 without having to define those components at the source code level. Additionally, in various embodiments, an organization may include, within a custom preview definition 124, components or applications provided by a third-party. For example, an organization may integrate a third-party application (e.g., a data visualization application) or a third-party web service (e.g., Google Maps) into a custom preview interface 108 for particular record type. In some embodiments, such a third-party application may be obtained from an application store associated with (e.g., hosted by) the server system 110.

As described in more detail below with reference to FIGS. 2A-2B and FIGS. 6A-6C, the nature of, and components included in, the custom preview interfaces 108 may vary depending on the record type for which the custom preview definition 124 is provided. Further, note that the user may provide custom preview definition 124 for multiple different record types for which the search service may return search results. For example, in some embodiments, a first organization may maintain data records of a "products" record type corresponding to products provided by the organization and data records of a "contacts" record type corresponding to contacts associated with the organization. In such an embodiment, a user associated with the first organization (e.g., an administrator) may specify a different custom preview interface 108 for these two different record types. When a user associated with the first organization then performs a search with the search service, search results belonging to these record types may be presented using the appropriate custom preview interface 108 that is specific to the first organization. For example, the organization may create a custom preview definition 124 that includes code for an Apex component based on the organization's product book to present a custom preview interface 108 for product data records, allowing the organization's users to take custom actions with respect to search results for product records provided in the search UI 106.

As shown in FIG. 1, once the server system 110 has provided suggested search results to populate the search UI 106, the user 101 may select a particular search result for which to view a preview. In response to this user input, the server system 110 may determine whether the selected search result is associated with a custom preview definition 124, as explained in more detail below with reference to FIG. 4. If not, the server system 110 may either provide no preview for the selected search result or may provide a default preview for the search result. For example, as shown in FIG. 1, data store 130 may include one or more default preview definitions 126 that may be used to generate a default preview interface for a search result in the event that the organization with which the requesting user is associated has not provided a custom preview definition 124 for the record type of the selected search result. If, however, the selected search result is associated with a custom preview definition 124, the server system 110 may retrieve the appropriate custom preview definition 124 from the data store 130. In various embodiments, the search assistant module 114 may use the definition 124 to generate data indicative of the custom preview interface 108 for the selected search result, which may be sent to the client device 102 for display within the search UI 106.

Note that, in various embodiments, the disclosed systems and methods may be used to provide a custom preview interface for a selected search result based on any of various characteristics of the search result. For example, as noted above and described in more detail below, an organization may specify a custom preview interface 108 for a particular record type by providing a custom preview definition 124 that may be used to generate a custom preview interface 108 for search results of the particular record type. In some embodiments, an organization may specify a custom preview interface 108 for a particular record (that is, on a per-record basis) by providing a custom preview definition 124 that may be used to generate a custom preview interface 108 when the particular record is provided as a search result (via the search UI 106) and selected by a user 101. Further, in some embodiments, an organization may define a custom preview interface 108 for a particular record based on metadata or context information about user-interaction patterns with the particular record. Additionally, in some embodiments, an organization may define a custom preview interface 108 based on metadata or context information about information derived from the search query provided by the user.

Figure 2A:
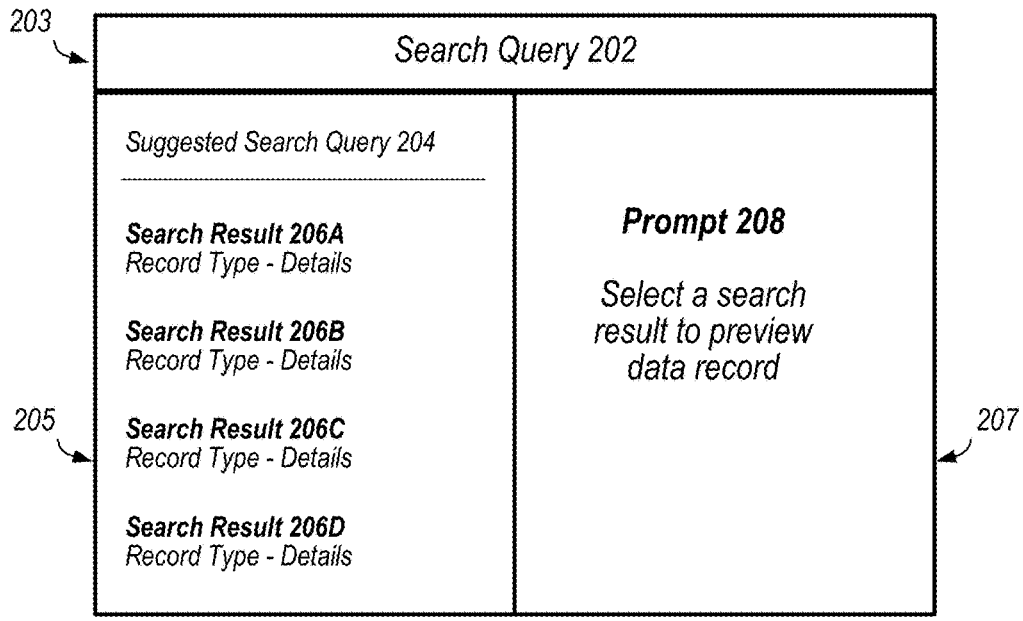
FIGS. 2A-2B depict example views of a search user interface that may be used to present search results to a user of a search service, according to some embodiments.
Figure 2B:
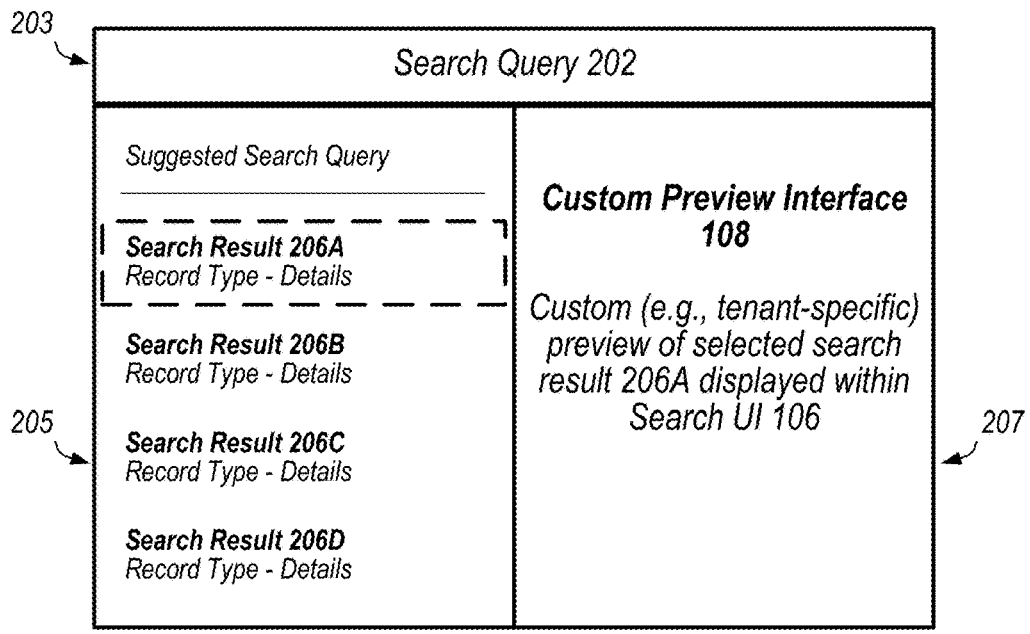

FIGS. 2A-2B depict two example views of a search UI 106 that may be used to present search results to a user 101 of a search service provided by server system 110, according to some embodiments. In the depicted embodiment, FIG. 2A depicts a search UI 106 as it may be presented as the user 101 enters a search query 202, according to some embodiments. As shown in FIG. 2A, search UI 106 may include a number of components used to convey information to the user 101. For example, in FIG. 2A, search UI 106 includes a search bar 203 in which the user may provide a search query 202. Additionally, in the depicted embodiment, search UI 106 includes panels 205 and 207 that may be used to present suggested search results, suggested search results, custom preview interfaces 108, or various other components. In the depicted embodiment, as the user 101 enters the search query 202, the server system 110 may retrieve and provide suggested search queries 204 and suggested search results 206 in panel 205. For example, in the depicted embodiment, panel 205 depicts four suggested search results 206A-206D. Further, in the depicted embodiment, panel 205 includes a suggested search query 204 that is determined by the search assistant module 114 based on the content of the search query 202 that the user has entered into the search bar 203 thus far. Panel 207, in the depicted embodiment, presents a prompt 208, which may be used to provide the user with guidance on how to best use the search UI 106 or provide other information. As a non-limiting example, in FIG. 2A, prompt 208 instructs the user to select a search result to preview the corresponding data record within panel 207. Note, however, that this specific prompt 208 is provided merely as an example and, in other embodiments, the content of the prompt 208 may vary or prompt 208 may be omitted, as desired.

In various embodiments, when the user selects one of the search results 206, the server system 110 may provide data indicative of a custom preview interface 108 for the selected search result 206. For example, in the embodiment depicted in FIG. 2B, the user has selected search result 206A. The user may make the selection via client device 102 using any of various suitable input techniques, such as selecting search result 206a using a mouse, a keyboard, voice command, touchscreen gesture, or any other suitable input technique. Once the server system 110 receives the user input selecting the search result 206A via the search UI 106, the server system 110 may determine that the record type of search result 206A matches a record type for which there is a custom preview definition 124 that may be used to provide a custom preview interface 108 to the requesting user 101. As shown in FIG. 1, the server system 110 may retrieve this custom preview definition 124, which may include code usable to generate some or all of the custom preview interface 108 for the search result 206A.

In some embodiments, server system 110 may execute at least a portion of this code to generate the custom preview interface 108 for search result 206A and then provide data indicative of that custom preview interface 108 to the client device 102 (e.g., provided in HTML, CSS, JavaScript, JSON, or any other suitable format usable by the client device 102 to display the custom preview interface 108). The client device 102 may then render the provided data to display the custom preview interface 108 for search result 206A via the client device 102. Note that, in some embodiments, code included in the custom preview definition 124 may be usable by an application at the client device 102 to generate some or all of the custom preview interface 108. For example, in some embodiments, the custom preview definition 124 for the search result 206A may include JavaScript or other code executable by the browser application 104 to generate one or more components in the custom preview interface 108. Further, in some embodiments, the custom preview definition 124 for the search result 206 may include one or more API calls to third-party services to incorporate third-party components into the custom preview interface 108. As one non-limiting example, server system 110 may send, to client device 102, data indicative of the custom preview interface 108 that includes an API call to a web service (such as the Google Maps platform, for example) that incorporates a customized map into the custom preview interface 108. Note, however, that this embodiment is provided merely as an example and is not intended to limit the scope of the present disclosure. In other embodiments, various other suitable types of third-party interface components may be integrated into the custom preview interface 108, such as graphs, charts, calendars, etc. Additionally, in some embodiments, the code included in the custom preview definition 124 may include data provided in HTML, CSS, or JSON that is usable by the browser application 104 on the client device 102 to render one or more components or characteristics of the custom preview interface 108.

Additionally note that, in various embodiments, the custom preview interface 108 presented in the search UI 106 may allow a user to modify search result records directly within the search UI 106 itself. For example, in various embodiments, the custom preview interface 108 may present a set of action items that the user may utilize to modify the data record 120 of a search result 206. As non-limiting examples, the action items included in a custom preview interface 108 may include: add a note to a data record, delete the data record, clone the data record, change the owner of the data record, etc. In various embodiments, this feature of the custom preview interfaces 108 may allow users to modify data records 120 directly from the search UI 106, rather than having to access the data record 120 via a separate application, saving the user time and effort.

Figure 3:
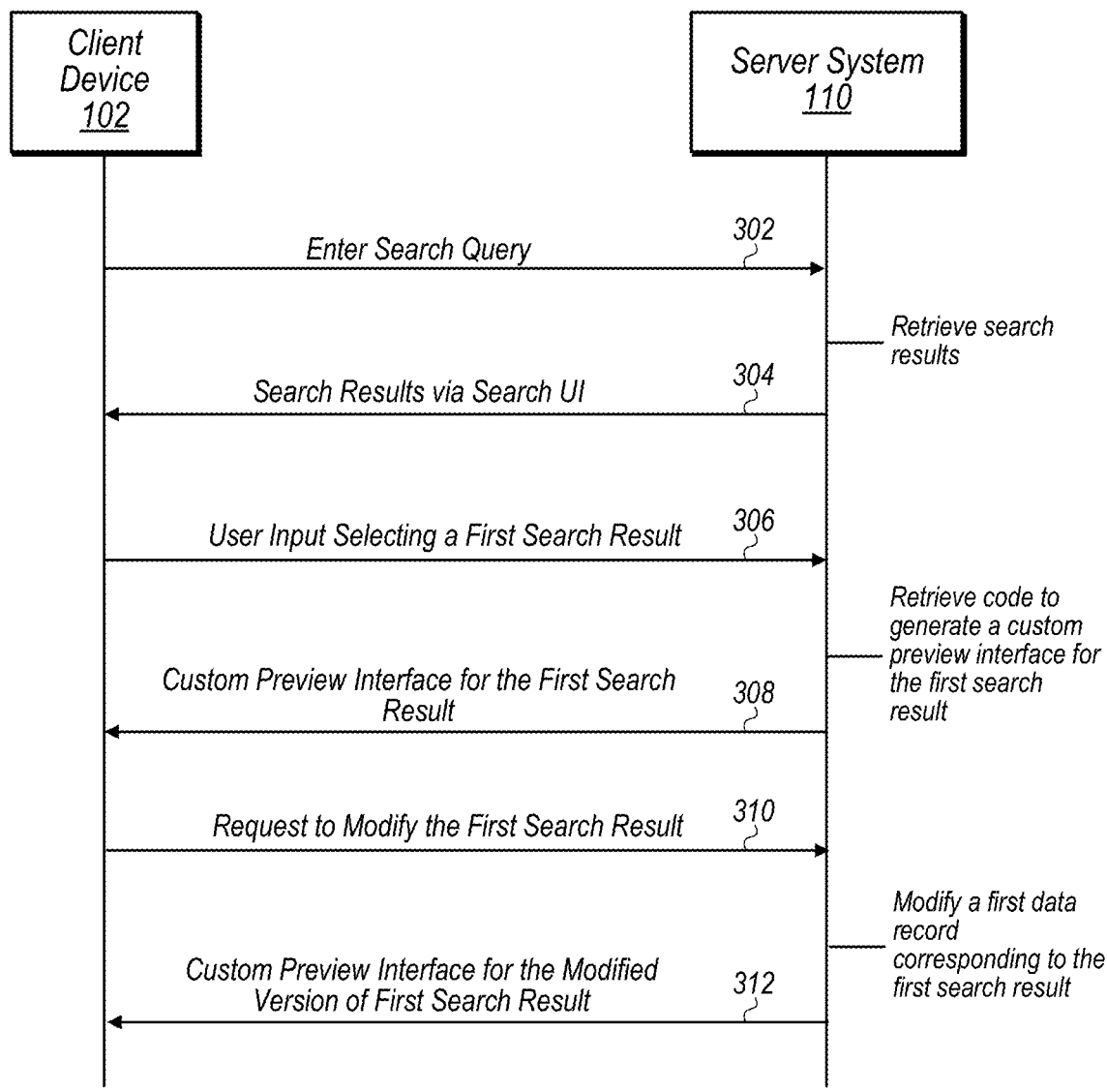
FIG. 3 is a communication diagram illustrating an exchange between a client device and a server system that provides a search service, according to some embodiments.

FIG. 3 depicts a communication diagram 300 of an exchange between client device 102 and server system 110, according to some embodiments. In the illustrated embodiment, the exchange begins at communication 302 in which the user 101 enters a search query into a search UI 106 of the search service provided by the server system 110. In response to the search query, the server system 110 retrieves one or more search results, for example from data store 130. In various embodiments, each of the search results is associated with corresponding metadata 122. For example, in some embodiments, each of the search results may correspond to a data record 120 stored within data store 130 and the corresponding record metadata 122 for each data record 120 may specify its record type, an identifier of the organization with which the data record 120 or the user 101 is associated, access permissions for the data record 120, or any of various other suitable items of metadata. At communication 304, in the depicted embodiment, the server system 110 provides the search results to the client device via the search UI 106. In various embodiments, the server system 110 may provide suggested search results as the user 101 is entering the search query. As such, in various embodiments, this process of retrieving suggested search results and providing those search results to the client device 102 via the search UI 106 may be repeated multiple times during the course of a single search query.

At communication 306, in the depicted embodiment, server system 110 receives user input selecting a first one of the one or more search results provided via the search UI 106. For example, as discussed above with reference to FIG. 2B, user 101 may select search result 206A presented via the search UI 106. In response to communication 306, server system 110 may retrieve a custom preview definition 124 associated with the selected search result 206A. For example, in some embodiments, the server system 110 may determine, based on metadata 122 associated with the selected search result 206A, that the record type of search result 206A matches a record type for which a custom preview definition 124 has been specified. In some embodiments, for example, the user of client device 102 may be associated with a first tenant of the server system 110 that has provided a custom preview definition 124 for search results that match the record type of search result 206A. In such embodiments, server system 110 may compare the record type of the search result 206A to the record types specified by the custom preview definition(s) 124 to determine whether the first tenant has specified a custom preview interface 108 for the particular record type. If so, server system 110 may retrieve the appropriate custom preview definition 124 and use that definition 124 to generate a custom preview interface 108 for the search result 206A.

At communication 308, in the depicted embodiment, server system 110 provides data corresponding to the custom preview interface 108 for the first search result 206A to the client device 102. As discussed above, browser application 104 (or another software application executing on the client device 102) may use this data to render the custom preview interface 108 as part of the search UI 106. Note that, in some embodiments, the user 101 may interact with the selected search result 206A directly from the custom preview interface 108. For example, in some embodiments, the user 101 may update values for one or more of the fields in the underlying data record 120 corresponding to the first search result 206A. At communication 310 in FIG. 3, the server system 110 receives this request to modify the first search result 206A. In response to this request, server system 110 may modify one or more fields of the data record 120 stored in data store 130 that corresponds to this first search result 206A. In various embodiments, once it has modified the search result 206A as requested by the user, server system 110 may provide the client device 102 with updated data indicative of the custom preview interface 108 that depicts a modified version of the search result 206A. In this way, the user may quickly identify and interact with a desired data record 120 directly from a custom preview interface 108 that was specified by the organization to which the user belongs.

As noted above, this may result in saved time and effort on the part of the user, improving the user experience and the search service as a whole.

Figure 4:
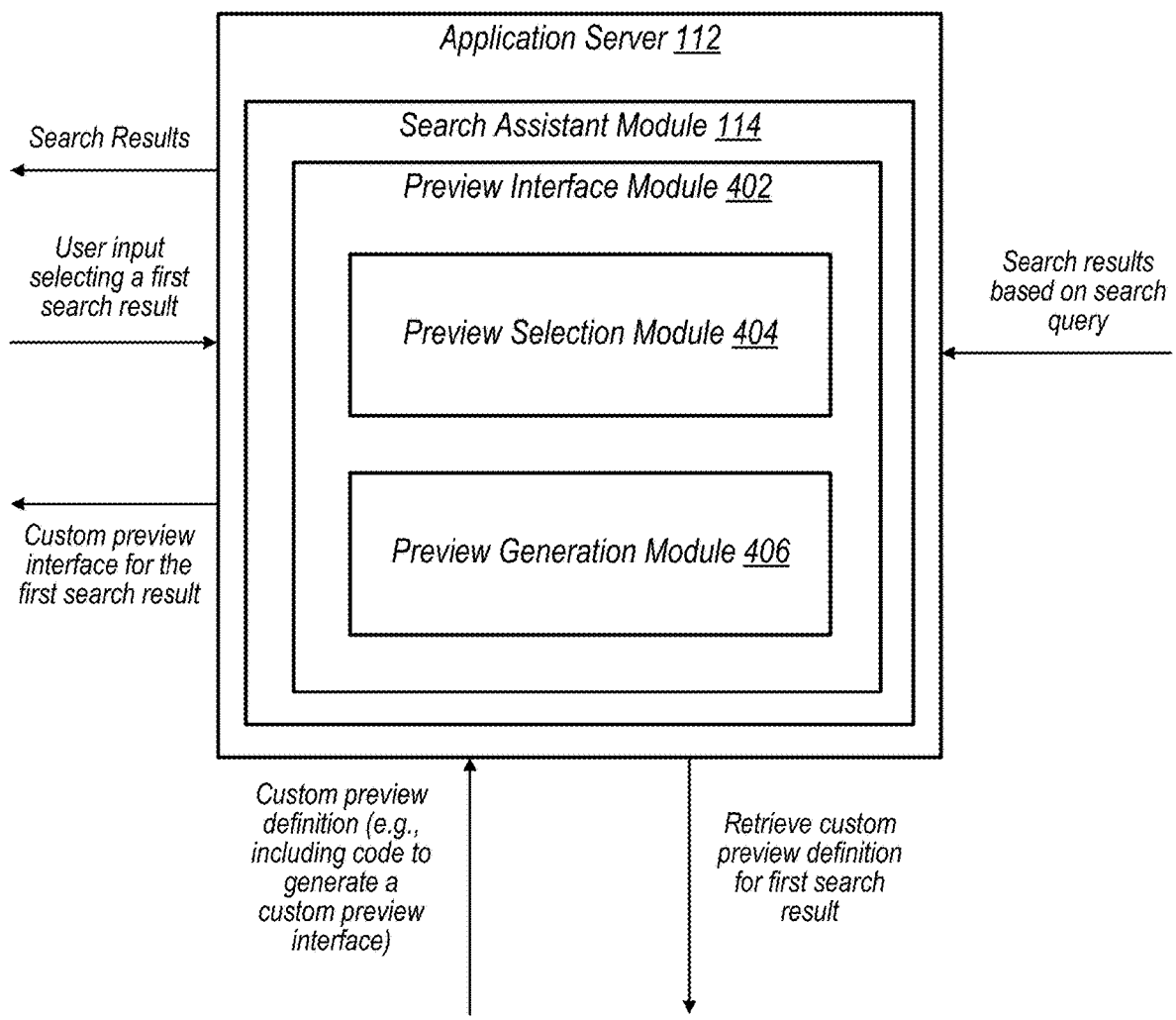
FIG. 4 is a block diagram illustrating an example embodiment of an application server, according to some embodiments.

Referring now to FIG. 4, block diagram 400 depicts an example embodiment of application server 112. In various embodiments, application server 112 is included in server system 110 and is operable to facilitate the display of one or more custom preview interfaces 108 for search results provided to the user 101 via the search service. In the embodiment shown in FIG. 4, application server 112 includes search assistant module 114. In various embodiments, search assistant module 114 is operable to perform various functions associated with the search service provided by server system 110. For example, as described above, a user 101 of client device 102 may select a search result 206 via the search UI 106 to request that a preview be presented. In various embodiments, search assistant module 114 includes preview interface module 402, which is operable to generate and provide a preview interface for the selected search result 206 to the requesting user 101.

Preview interface module 402 of FIG. 4 includes preview selection module 404 and preview generation module 406. In various embodiments, preview selection module 404 is operable to select a preview of a selected search result 206 to provide to a client device 102 of the requesting user 101. For example, as described above with reference to FIG. 1, in various embodiments a particular group that uses server system 110 may specify a custom preview definition 124 for one or more record types for which the server system 110 maintains data records. If the group with which the requesting user 101 is associated has provided a custom preview definition 124 for the record type of the selected search result 206, search assistant module 114 may retrieve that custom preview definition 124 and generate data indicative of the custom preview interface 108 for that selected search result 206. If, however, the group has not specified a custom preview definition 124 for the record type of the selected search result 206, search assistant module 114 may provide a default preview for the selected search result 206. For example, data store 130 may include default preview definitions 126 for various record types that may be used by default if a given group has not overridden the default preview definitions 126 with a custom preview definition 124 for a particular record type. In the event that a search results 206 selected by the user via search UI 106 is not associated with a custom preview definition 124, search assistant module 114 may generate a default preview for the selected search result 206.

In various embodiments, preview selection module 404 is operable to determine whether to provide a default preview or a custom preview for the selected search result 206. Preview selection module 404 may make such termination using various suitable techniques. For example, in some embodiments, preview selection module 404 may include (or have access to) information indicating the record types for which a given group of users (e.g., tenant) has provided a custom preview definition 124. For example, in some embodiments, such information may be stored in a lookup table, database object, or any other suitable data structure that preview selection module 404 may use to determine whether a custom preview definition 124 exists for a selected search result 206. As one non-limiting example, when the user selects a search result 206 to preview, the server system 110 may receive a request that identifies the selected search result 206, for example by its record ID. In some such embodiments, preview selection module 404 may use this record ID and the identity of group to which the requesting user 101 belongs (which may be implicit from the session between the server system 110 and the client device 102) to determine whether that group has provided a custom preview definition 124 for the record type of the selected search result 206. If so, search assistant module 114 may retrieve the custom preview definition 124. If not, the search assistant may instead retrieve a default preview definition 126 for the record type of the selected search result 206.

As noted above, the custom preview definition 124 may, in some embodiments, include code that is usable to generate one or more components to be included in the custom preview interface 108. In various embodiments, preview generation module 406 is operable to use the custom preview definition 124 to generate data that is indicative of the custom preview interface 108 for the selected search result 206. For example, some embodiments, preview generation module 406 may execute some or all of the code included in the custom preview definition 124 to generate data for one or more of the components included in the custom preview interface 108. In other embodiments, however, some or all of the code included in the custom preview definition 124 may be usable (e.g., executable or otherwise usable to generate or render the custom preview interface 108) by the browser application 104 (or another client application) executing on the client device 102. In some such embodiments, the data indicative of the custom preview interface 108 sent to the client device 102 may include this code such that it may be used at the client device 102 to generate one or more components for the custom preview interface for the selected search result 206.

Further, in some embodiments, a custom preview interface 108 may include components generated by third-party software applications or third-party web services. For example, as noted above, server system 110 may include numerous software applications and provide various web services. In some embodiments, a custom preview definition 124 may specify one or more of the applications or services provided by server system 110 for use in a corresponding custom preview interface 108. In such embodiments, preview generation module 406 may generate one or more components for the custom preview interface 108 by making a call to the relevant application or service within the server system 110. Further, in some embodiments, a custom preview definition 124 may specify a third-party application or web service (e.g., a map service, calendar service, email service, etc.) for use in a corresponding custom preview interface 108. In such embodiments, the component(s) to be provided by these third-party applications or services may be generated by making a call (e.g., an API call) to the relevant third-party. In some embodiments, such API calls may be performed either by the application server 112 at the server system 110 or by the browser application 104 (or other client application) executing at the client device 102. For example, in some instances, the data indicative of the custom preview interface 108 may be webpage data that includes a JavaScript API call to a third-party service.

Turning now to FIG. 5, a flow diagram illustrating an example method 500 for providing a custom preview interface for a selected search result is depicted, according to some embodiments. In various embodiments, method 500 may be performed by server system 110 of FIG. 1 to provide a custom preview interface 108 to the client device 102, which may allow the requesting user 101 to inspect and interact with a selected search result 206 within a search UI 106. For example, server system 110 may include (or have access to) a non-transitory, computer-readable medium having program instructions stored thereon that are executable by the server system 110 to cause the operations described with reference to FIG. 5. In FIG. 5, method 500 includes elements 502-512. Although these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, server system 110, which provides a search service to various remote users (e.g., such as the user 101 of client device 102), receives a custom preview definition 124 that specifies code usable to generate a custom preview interface 108 for search results of a particular record type. In various embodiments, the custom preview definition 124 is received from a user of the search service. For example, as discussed above, server system 110 may provide computing resources to one or more groups of users. In various embodiments, each of the groups of users may provide custom preview definitions 124 for one or more record types, enabling the server system 110 to generate custom preview interfaces 108 for search results of these record types when users of the respective groups use the search service. Accordingly, in various embodiments, one or more users within each of the groups of users may provide custom preview definitions 124 to the server system 110. In some embodiments, server system 110 is a multi-tenant computer system that provides computing resources to various tenants, each of which may include various users. In some such embodiments, the custom preview definition 124 may be executable to generate a custom preview interface 108 for users that are associated with a first tenant of the multi-tenant server system 110. Further note that, in some embodiments, the custom preview definitions 124 may be usable to generate custom preview interfaces 108 for some or all of the users belonging to a particular tenant, and not simply just the user that provided the custom preview definition 124.

At 504, the illustrated embodiment, the server system 110 receives, a search query from a particular user 101 of the search service. For example, in some embodiments, the user 101 of client device 102 may be associated with a first tenant of the server system 110. At 506, in the illustrated embodiment, the server system 110 retrieves one or more search results based on the search query provided by the user 101. In various embodiments, each of these one or more search results is associated with corresponding metadata. For example, as described above, various records 120 maintained in data store 130 may be associated with corresponding record metadata 122. The data fields included within record metadata 122 may vary in different embodiments. In some embodiments, for example, the record metadata 122 for a given record 120 may include one or more of: an organization identifier that identifies the organization with which the record 120 is associated, a record type identifier that identifies the type of the data record, a custom preview identifier that indicates whether there is a custom preview definition 124 associated with the record 120 or the record data type, etc. Note, however, that these specific data fields are provided merely as an example and are not intended to limit the scope of the present disclosure. In other embodiments, record metadata 122 may include any of various other suitable data fields, as desired.

In some embodiments, subsequent to retrieving the one or more search results at element 506, method 500 may include the server system 110 providing, to the client device 102, data indicative of will a search interface 106 that is usable to present the one or more search results via the client device 102. At 508, in the illustrated embodiment, server system 110 receives, from the client device 102, user input identifying a first search result of the one or more search results previously provided to the user 101. Once the user has selected a search result for which to provide a preview, server system 110 may determine whether to provide a default preview or a custom preview (e.g., specified by the group with which the requesting user is associated) for the selected search result. For example, at 510, in the illustrated embodiment, the server system 110 determines that a record type of a first search results, selected by the user 101, matches the particular record type specified by the custom preview definition 124. In some embodiments, this determination may be made based on the corresponding metadata 122 associated with data record 120 of the first search result. At 512, in the illustrated embodiment, the server system 110 retrieves the specified code to facilitate the display of the custom preview interface 108 for the first search result at the client device 102. For example, as shown in FIG. 1, the search assistant module 114 may retrieve the custom preview definition 124 from the data store 130. In various embodiments, search assistant module 114 may execute some or all of the program code specified the custom preview definition 124 to generate one or more components to be included in the custom preview interface 108. In various embodiments, method 500 may further include providing, to the client device 102, data indicative of the custom preview interface 108 that may be used by the browser application 104 executing on the client device 102 to render the custom preview interface 108 within the search UI 106.

Figure 6A:
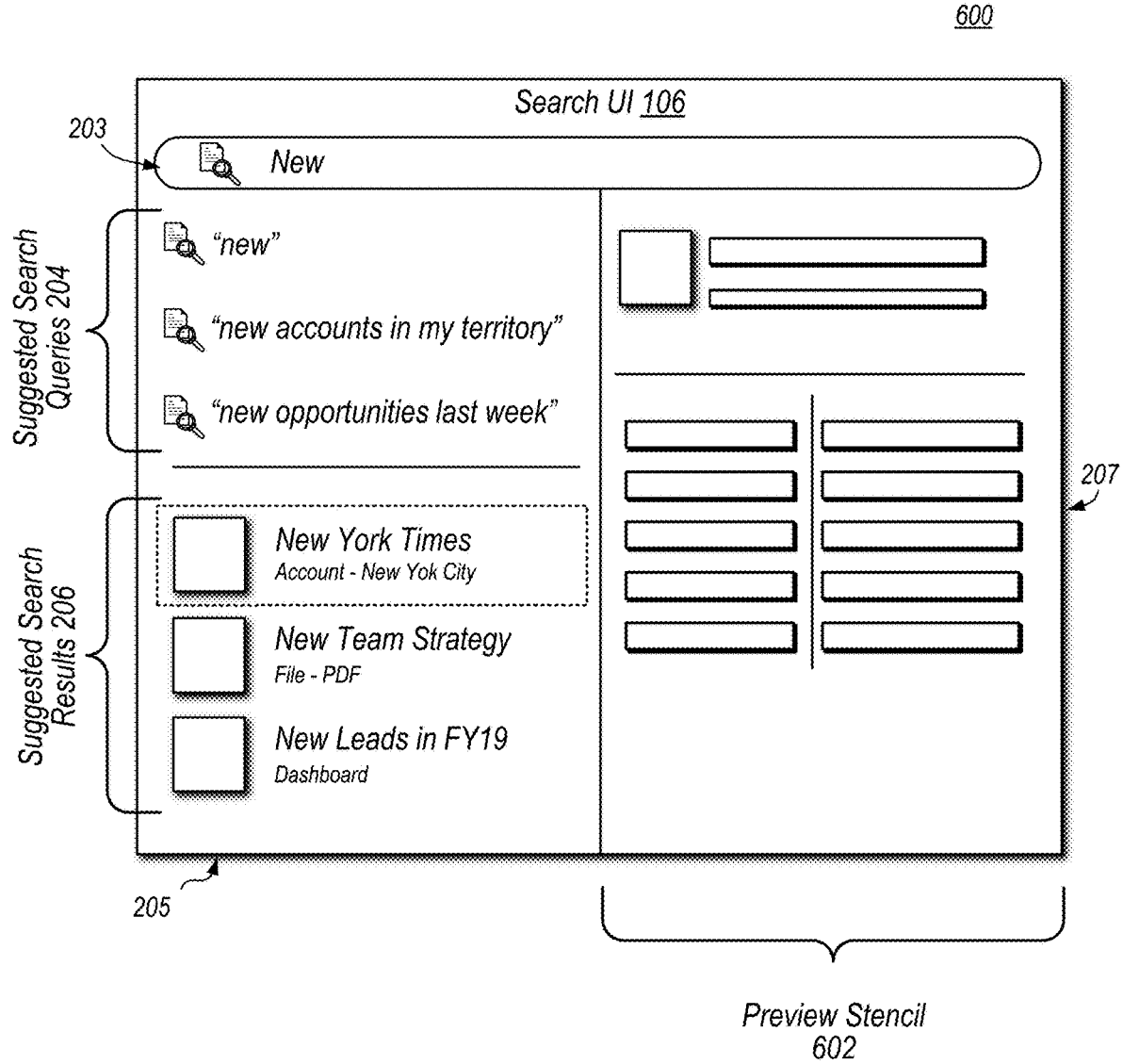
FIGS. 6A-6C depict example views of a search user interface used to provide a custom preview interface for a selected search result, according to some embodiments.
Figure 6B:
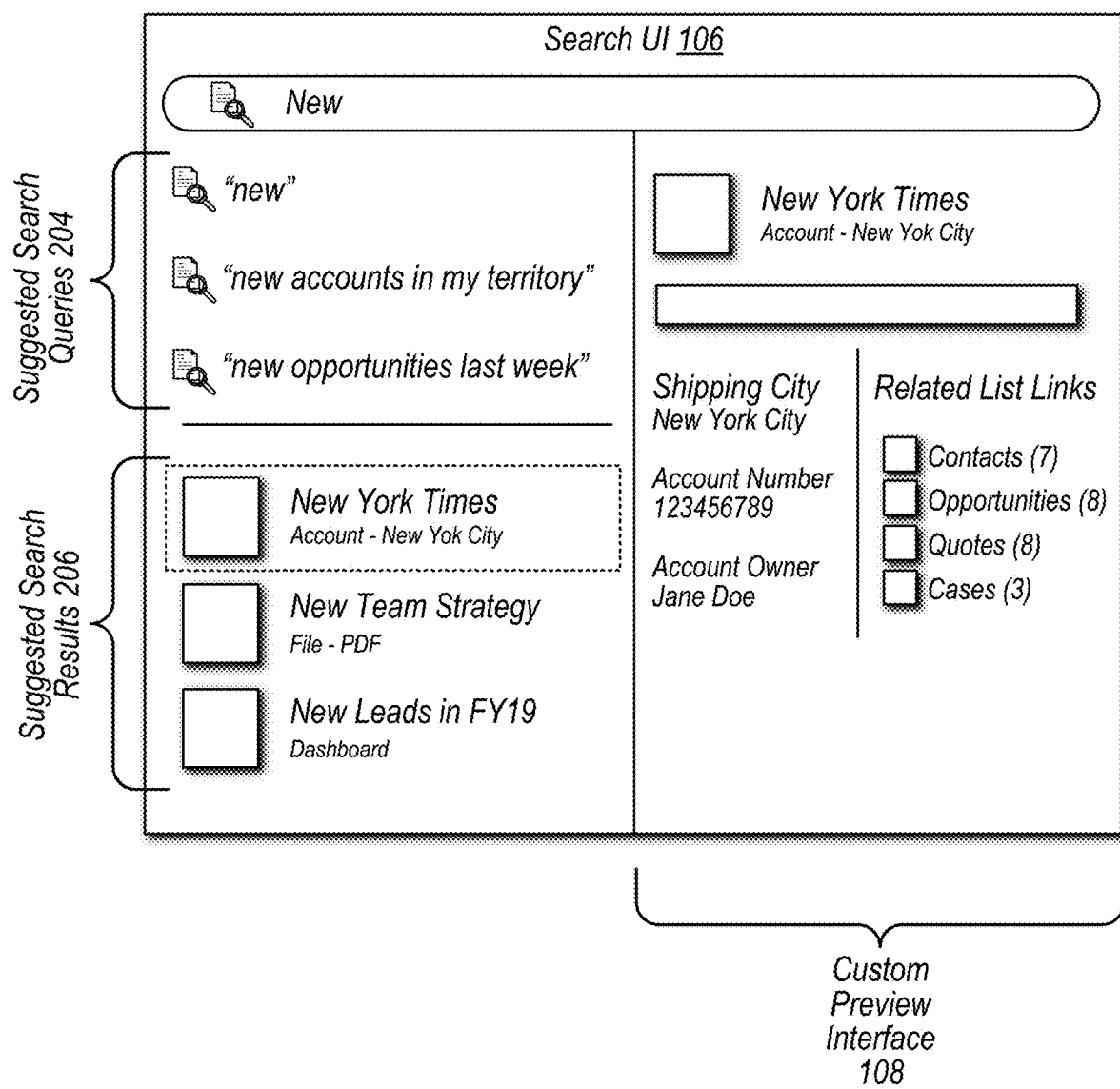
Figure 6C:
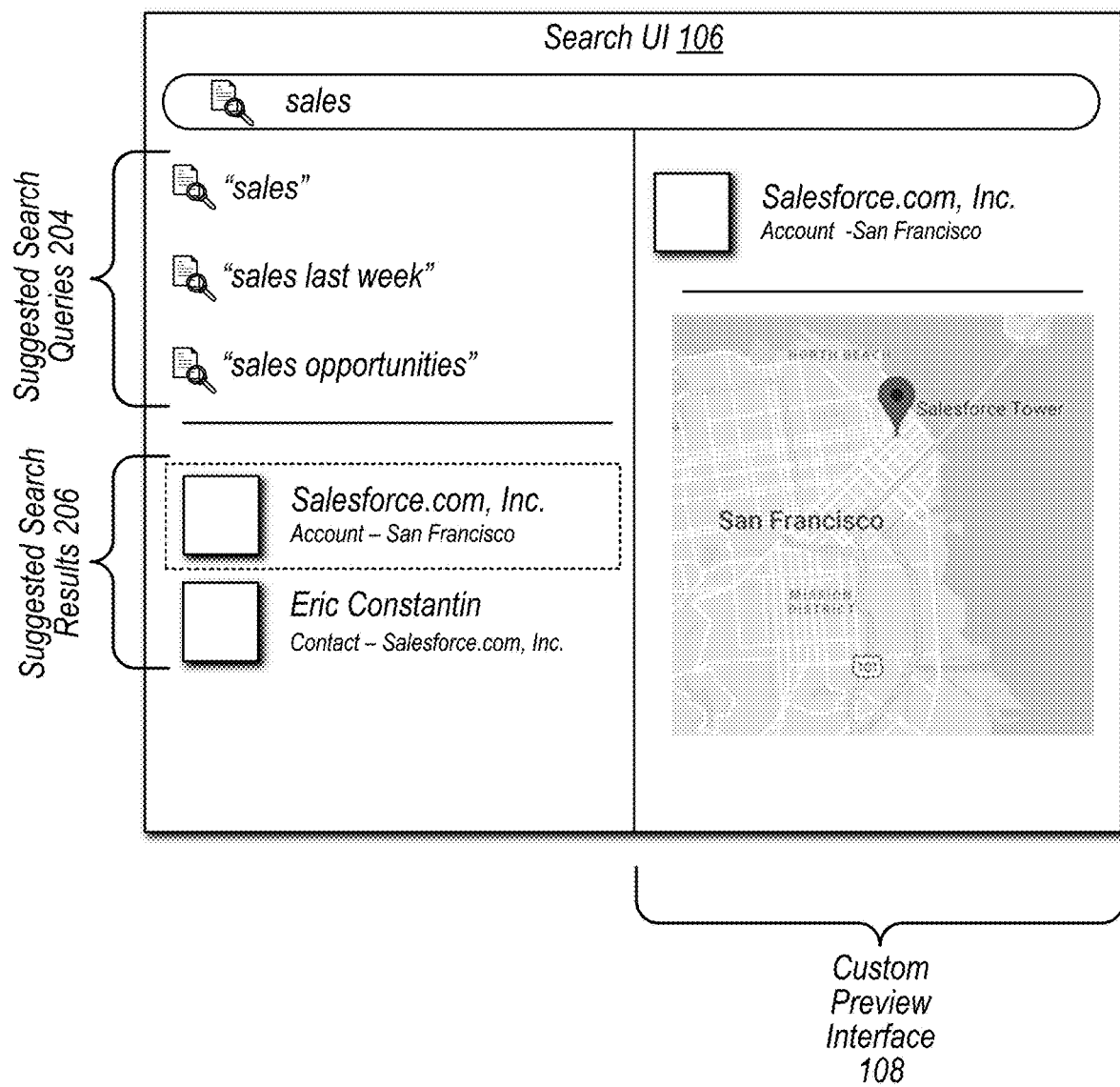

FIGS. 6A-6C depict example embodiments of a search UI 106, according to some embodiments. In various embodiments, the search UI's 106 shown in FIGS. 6A-6C may be used to present search results and custom preview interfaces 108 to a user of the search service provided by the server system 110. In FIG. 6A, for example, search UI 106 includes a search bar 203, a left panel 205, and a right panel 207. In the depicted embodiment, the user has entered a portion of a search query into the search bar 203 and the server system 110 has populated the search UI 106 with suggested content based on this partial search query. For example, in the upper portion of panel 205, search UI 106 includes a list of suggested search queries 204 based on the search query that is currently entered into the search bar 203. Further, in the depicted embodiment, the lower portion of panel 205 depicts a list of suggested search results 206. In various embodiments, the suggested search results 206 may correspond to data records 120 of different record types. For example, in FIG. 6A, the suggested search results 206 include data records 120 of an "account" record type, a "file" record type, and a "dashboard" record type. Note that these suggested search results are provided merely as an example and are not intended to limit the scope of the present disclosure. In other embodiments, search UI 106 may be populated with various other types of suggested search results. For example, in some embodiments, search UI 106 may include a list of suggested search results 206 based on the current search query. Further note that the location of the various components (e.g., suggested search queries 204, suggested search results 206, custom preview interface 108, etc.) within the search UI 106 may differ, according to various embodiments. For example, search UI 106 may include any suitable number and configuration of panels that may be used to present the various components in any suitable position, as desired.

As the user enters the search query into the search bar 203, search UI 106 may be updated to reflect the current search results for the current search query. In various embodiments, if the user selects a particular search result (e.g., a suggested data record or list of data records), panel 207 may be used to present a corresponding preview that allows the user to review a search result within the search UI 106. For example, a user 101 may key down or hover a cursor over a record in the suggested search results 206 to load a preview in the right panel 207, according to some embodiments. In various embodiments, panel 207 may present a preview stencil 602 while the data for the custom preview interface 108 is generated by the server system 110. As described above, each custom preview interface 108 may be customized for the user's organization based on the specific record type. For example, for a first tenant of the server system 110, a custom preview interface 108 for an "opportunity" data record may differ from a custom preview interface 108 for a "dashboard" data record. Note that, in various embodiments, server system 110 does not "optimistically" populate the search UI 106 with a custom preview interface 108 before the user has selected a search result 206, as such functionality may serve as a distraction to the user 101 and, in some instances, detract from the user experience with the search UI 106. Instead, in such embodiments, the server system 110 may provide custom preview interfaces 108 in response to a positive selection, by the user 101, of one of the search results 206 provided in the search UI 106.

Turning to FIG. 6B, diagram 610 depicts a search UI 106 in which the custom preview interface 108 for the selected search result 206 has been rendered at the client device 102. In the depicted embodiment, the custom preview interface for this example "account" record type includes various items of information, such as the shipping city, the account number, and the account owner. Further, in the depicted embodiment, the custom preview interface 108 includes a related list of links that may be selected by the user 101 to further facilitate identifying and interacting with search results from within the search UI 106. Note, however, that the custom preview interface 108 provided in FIG. 6B is provided merely as an example. In other embodiments, a custom preview interface 108 may include any of various components selected by the group providing the custom preview definition 124 for the custom preview interface 108. For example, in FIG. 6C, the custom preview interface 108 includes a map showing a location associated with the selected search result 206. In some embodiments, for example, the data indicative of the custom preview interface 108 sent to the client device may include an API call to a third-party service (e.g., the Google Maps platform) to generate one or more components in the custom preview interface.

Example Computer System

Figure 7:
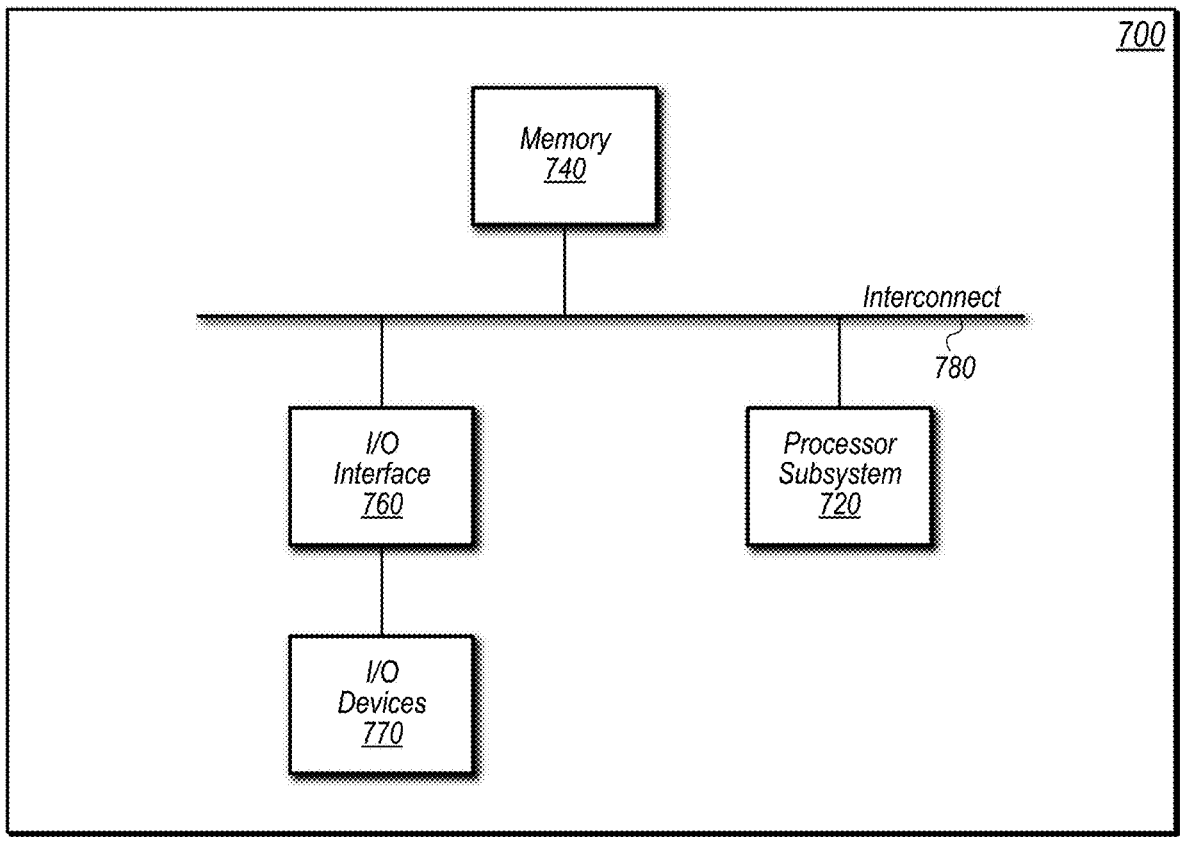
FIG. 7 is a block diagram illustrating an example computer system, according to some embodiments.

Referring now to FIG. 7, a block diagram of an example computer system 700 is depicted, which may implement one or more computer systems in the server system 110, such as application server 112 or search server 114 of FIG. 1, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over WiFi, Bluetooth, Ethernet, etc.), and computer system 700 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., search assistant module 114, preview interface module 402, etc.). As used herein, the term "module" refers to circuitry configured to perform specified operations or to physical, non-transitory computer-readable media that stores information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, at a multi-tenant server system of a search service, a first custom preview definition for a first subset of users of the search service that are associated with a first tenant of the multi-tenant server system, wherein the first custom preview definition specifies code usable to generate, for the first subset of users, a first custom preview interface for search results that correspond to data records of a particular record type, wherein the first custom preview interface for the first subset of users is different than a second custom preview interface, specified by a second custom preview definition for the particular record type, for a second subset of users of the search service;

receiving, at the server system from a client device, a search query from a particular one of the first subset of users;

based on the search query, the server system providing one or more search results to the client device, wherein a first search result, of the one or more search results, corresponds to a first data record that is associated with the first subset of users and is maintained by the server system;

receiving, by the server system from the client device, user input identifying the first search result of the one or more search results; and in response to receiving the user input identifying the first search result, selecting, by the server system, the first custom preview interface for the first search result based on a record type of the first data record corresponding to the first search result, including by:
identifying the record type of the first data record;
determining that the record type of the first data record matches the particular record type associated with the first custom preview definition for the first subset of users; and
retrieving the specified code to facilitate display of the first custom preview interface for the first search result at the client device.

2. The method of claim 1, further comprising:
executing, by the server system, at least a portion of the specified code to generate at least a portion of the first custom preview interface for the first search result; and
providing, by the server system to the client device, data indicative of the first custom preview interface.

3. The method of claim 1, further comprising:
providing, by the server system to the client device, data indicative of the first custom preview interface, wherein the data is usable, by an application on the client device, to render at least a portion of the first custom preview interface.

4. The method of claim 3, wherein at least a portion of the data includes an API call to a third-party service.

5. The method of claim 1, further comprising:
providing, by the server system to the client device, data indicative of a search interface usable to present the one or more search results;
wherein the user input is received, from the client device, via the search interface.

6. The method of claim 1, further comprising:
providing, by the server system to the client device, data indicative of the first custom preview interface for the first search result;
receiving, from the client device via the first custom preview interface, a request to modify the first data record corresponding to the first search result;
in response to the request, the server system modifying one or more fields of the first data record to generate a modified version of the first data record; and
storing, by the server system, the modified version of the first data record at the server system.

7. The method of claim 6, further comprising:
subsequent to modifying the one or more fields of the first data record, providing, by the server system to the client device, data indicative of the first custom preview interface that depicts the modified version of the first search result.

8. The method of claim 1, wherein the second subset of users are associated with a first second tenant of the multi-tenant server system, different from the first tenant.

9. The method of claim 1, wherein a user providing the first custom preview definition and the particular user submitting the search query are different users that are both associated with the first tenant.

10. A non-transitory, computer-readable medium having computer instructions stored thereon that are capable of being executed by a multi-tenant server system to cause operations comprising:
receiving a first custom preview definition for a first subset of users, associated with a first tenant of the multi-tenant server system, of a search service provided by the multi-tenant server system, wherein the first custom preview definition specifies code usable to generate, for the first subset of users, a first custom preview interface for search results that correspond to data records of a particular record type, wherein the first custom preview interface for the first subset of users is different than a second custom preview interface, specified by a second custom preview definition for the particular record type, for a second subset of users of the search service;
receiving, from a client device, a search query from a particular one of the first subset of users;
based on the search query, providing one or more search results to the client device, wherein a first search result, of the one or more search results, corresponds to a first data record that is associated with the first subset of users and is maintained by the server system;
receiving, from the client device, user input identifying the first search result of the one or more search results; and
in response to receiving the user input identifying the first search result, selecting the first custom preview interface for the first search result based on a record type of the first data record corresponding to the first search result, including by:
identifying the record type of the first data record;
determining that the record type of the first data record matches the particular record type associated with the first custom preview definition for the first subset of users; and
retrieving the specified code to facilitate display of the first custom preview interface for the first search result at the client device.

11. The non-transitory, computer-readable medium of claim 10, wherein the operations further comprise:
executing at least a portion of the specified code to generate at least a portion of the first custom preview interface for the first search result; and
providing, to the client device, data indicative of the first custom preview interface.

12. The non-transitory, computer-readable medium of claim 10, wherein the operations further comprise:
providing, to the client device, data indicative of the first custom preview interface, wherein the data is usable by an application on the client device to generate at least a portion of the first custom preview interface.

13. The non-transitory, computer-readable medium of claim 10, wherein the operations further comprise:
providing, to the client device, data indicative of the first custom preview interface for the first search result;
receiving, from the client device via the first custom preview interface, a request to modify the first data record corresponding to the first search result; and in response to the request, modifying one or more fields of the first data record to generate a modified version of the first data record; and storing the modified version of the first data record at the server system.

14. The non-transitory, computer-readable medium of claim 13, wherein the operations further comprise:

subsequent to modifying the one or more fields of the first data record, providing, by the server system to the client device, data indicative of the first custom preview interface that depicts the modified version of the first search result.

15. A multi-tenant server system, comprising:

at least one processor;

a non-transitory, computer-readable medium having instructions stored thereon that are executable by the at least one processor to cause the multi-tenant server system to:

receive a first custom preview definition for a first subset of users, associated with a first tenant of the multi-tenant server system, of a search service provided by the multi-tenant server system, wherein the first custom preview definition specifies code usable to generate, for the first subset of users, a first custom preview interface for search results that correspond to data records of a particular record type, wherein the first custom preview interface for the first subset of users is different than a second custom preview interface, specified by a second custom preview definition for the particular record type, for a second subset of users of the search service;

receive, from a client device, a search query from a particular one of the first subset of users;

based on the search query, provide one or more search results to the client device, wherein a first search result, of the one or more search results, corresponds to a first data record that is associated with the first subset of users and is maintained by the system;

receive, from the client device, user input identifying the first search result of the one or more search results; and in response to receiving the user input identifying the first search result, select the first custom preview interface for the first search result based on a record type of the first data record corresponding to the first search result, including by:

identifying the record type of the first data record;

determine that the record type of the first data record matches the particular record type associated with the first custom preview definition for the first subset of users; and retrieve the specified code to facilitate display of the first custom preview interface for the first search result at the client device.

16. The multi-tenant server system of claim 15, wherein the instructions are further executable to cause the system to:

provide, to the client device, data indicative of a search interface usable to present the one or more search results;

wherein the user input is received, from the client device, via the search interface.

17. The multi-tenant server system of claim 15, wherein the instructions are further executable to cause the system to:

provide, to the client device, data indicative of the first custom preview interface for the first search result;

receive, from the client device via the first custom preview interface, a request to modify the first data record corresponding to the first search result;

in response to the request, modify one or more fields of the first data record to generate a modified version of the first data record; and store the modified version of the first data record.

18. The multi-tenant server system of claim 17, wherein the instructions are further executable to cause the system to:

subsequent to modifying the one or more fields of the first data record, provide, to the client device, data indicative of the first custom preview interface that depicts the modified version of the first search result.

19. The multi-tenant server system of claim 15, wherein the second subset of users are associated with a second tenant of the multi-tenant server system, different from the first tenant.

* * * * *

UNITED STATES PATENT AND TRADEMARK OFFICE
CERTIFICATE OF CORRECTION

| | |
|---|---|
| PATENT NO. | : 11,360,649 B2 |
| APPLICATION NO. | : 16/776394 |
| DATED | : June 14, 2022 |
| INVENTOR(S) | : Constantin et al. |

It is certified that error appears in the above-identified patent and that said Letters Patent is hereby corrected as shown below:

In the Claims

In Column 18 (Claim 8), Line 2, please delete "a first second tenant" and insert -- a second tenant --.

Signed and Sealed this
Twelfth Day of July, 2022

Katherine Kelly Vidal
*Director of the United States Patent and Trademark Office*